(12) United States Patent
Wang

(10) Patent No.: US 7,096,773 B2
(45) Date of Patent: Aug. 29, 2006

(54) TELESCOPIC PNEUMATIC DEVICE

(75) Inventor: Yu-Jen Wang, Tainan Hsien (TW)

(73) Assignee: Fu Luong Hi-Tech Co., Ltd., (TW)

( * ) Notice: Subject to any disclaimer, the term of this patent is extended or adjusted under 35 U.S.C. 154(b) by 0 days.

(21) Appl. No.: 10/962,039

(22) Filed: Oct. 8, 2004

(65) Prior Publication Data

US 2006/0075891 A1    Apr. 13, 2006

(51) Int. Cl.
*F15B 11/08*    (2006.01)

(52) U.S. Cl. ....................................... 91/437; 92/169.1

(58) Field of Classification Search .................. 92/437, 92/169.1, 171.1; 297/338, 344.12, 344.16, 297/344.18, 344.19; 91/437
See application file for complete search history.

(56) References Cited

U.S. PATENT DOCUMENTS 6,382,077 B1 *    5/2002    Chen ........................... 91/437

* cited by examiner

*Primary Examiner*—Thomas E. Lazo
(74) *Attorney, Agent, or Firm*—Ostrolenk, Faber, Gerb & Soffen, LLP

(57) ABSTRACT

A telescopic pneumatic device comprises an outer cylinder, an inner cylinder disposed in the outer cylinder and having a cylinder wall defining an air chamber, a piston mounted in the air chamber and having a piston rod connected thereto, a flow passage provided between the cylinder wall and the outer cylinder, and a control valve operable to permit or interrupt fluid communication between the flow passage and the air chamber. The inner cylinder is made of a rigid plastic material and includes a valve mounting part for receiving the control valve, the valve mounting part being formed in one piece with the cylinder wall.

5 Claims, 4 Drawing Sheets

TELESCOPIC PNEUMATIC DEVICE

BACKGROUND OF THE INVENTION

1. Field of the Invention

The present invention relates to a pneumatic device, in particular to a telescopic pneumatic device.

2. Description of the Related Art

Shown in FIG. 1 is a generally known telescopic pneumatic device. Such pneumatic device comprises a vertical tubular outer cylinder 21 and an annular lower end cap 22, a leak-preventing washer 23 and a sleeve 24 sequentially disposed in that order of arrangement from the bottom end of the outer cylinder 21, a tubular inner cylinder 25 coaxially disposed in the outer cylinder 21 and abutting the top end of the sleeve 24, a vertically movable piston 26 mounted in the inner cylinder 25, a piston rod 27 connected to the piston 26 and extending downwardly out of the outer cylinder 21, an upper end cap 28 provided at the top end of the inner cylinder 25, and control means 29 mounted in the upper end cap 28.

The inner and outer air chambers 20,10 defined by the inner and outer cylinders 25, 21, respectively, are filled with compressed gas, and the control means 29 controls the flow of the compressed gas in the inner and outer air chambers 20,10 and, in turn, controls the length of the piston rod 27 that protrudes out of the outer cylinder 21.

However, during assembly and machining of the above-described pneumatic device, the steps involved in the assembly of the control means 29 and the upper end cap 28 are too many and complex, and the machining cost of the upper end cap 28 is high. In addition, since most inner cylinders are generally made of steel material, in order to enable the piston 26 which is mounted in the inner cylinder 25 to slide smoothly in movement and to avoid occurrence, during use, of even greater wearing of the sealing gasket which is disposed around the piston 26, which is caused by too much frictional force subjected to the internal wall of the inner cylinder 25, the requirement for smoothness and fineness of the internal wall of the steel inner cylinder 25 is usually higher. In view of this, the cost of the machining process for the steel inner cylinder 25 is high. Compounded with the increasing prices of steel with the passing of time, the overall manufacturing costs for the telescopic pneumatic device is extensively increased.

SUMMARY OF THE INVENTION

An object of the present invention, therefore, is to provide a telescopic pneumatic device with an inner cylinder made of rigid plastic material, which is of a simpler construction and can be manufactured at lower costs.

Accordingly, a telescopic pneumatic device according to the present invention comprises an outer cylinder; an inner cylinder disposed in the outer cylinder and being made of a rigid plastic material, the inner cylinder including a cylinder wall defining therein an air chamber, and a valve mounting part which is formed in one piece with the cylinder wall, the valve mounting part having a first cavity; a piston capable of reciprocal motion mounted in the air chamber; a piston rod connected to the piston and extending out of the outer cylinder; a flow passage provided between the cylinder wall and the outer cylinder and having two ends connected respectively to the first cavity and the air chamber; and a control valve mounted within the valve mounting part and including a valve section disposed within the first cavity and an operating section connected to the valve section and being operable to control the valve section so as to permit or interrupt fluid communication between the flow passage and the air chamber.

BRIEF DESCRIPTION OF THE DRAWINGS

Other features and advantages of the present invention will become apparent in the following detailed description of the preferred embodiment with reference to the accompanying drawings, in which.

DETAILED DESCRIPTION OF THE PREFERRED EMBODIMENTS

Figure 1:
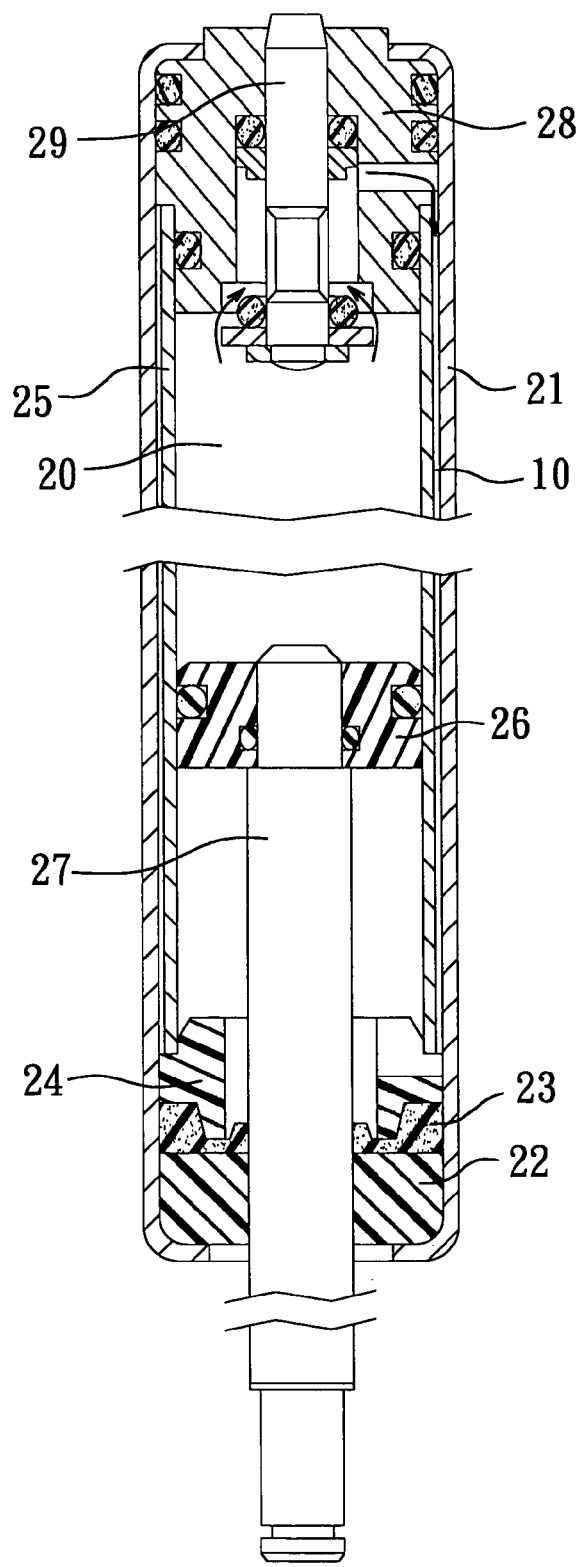
FIG. 1 is a sectional view of a conventional telescopic pneumatic device.

In the following description of the preferred embodiments of the present invention, like reference numerals are used to identify like elements in the drawings.

Figure 2:
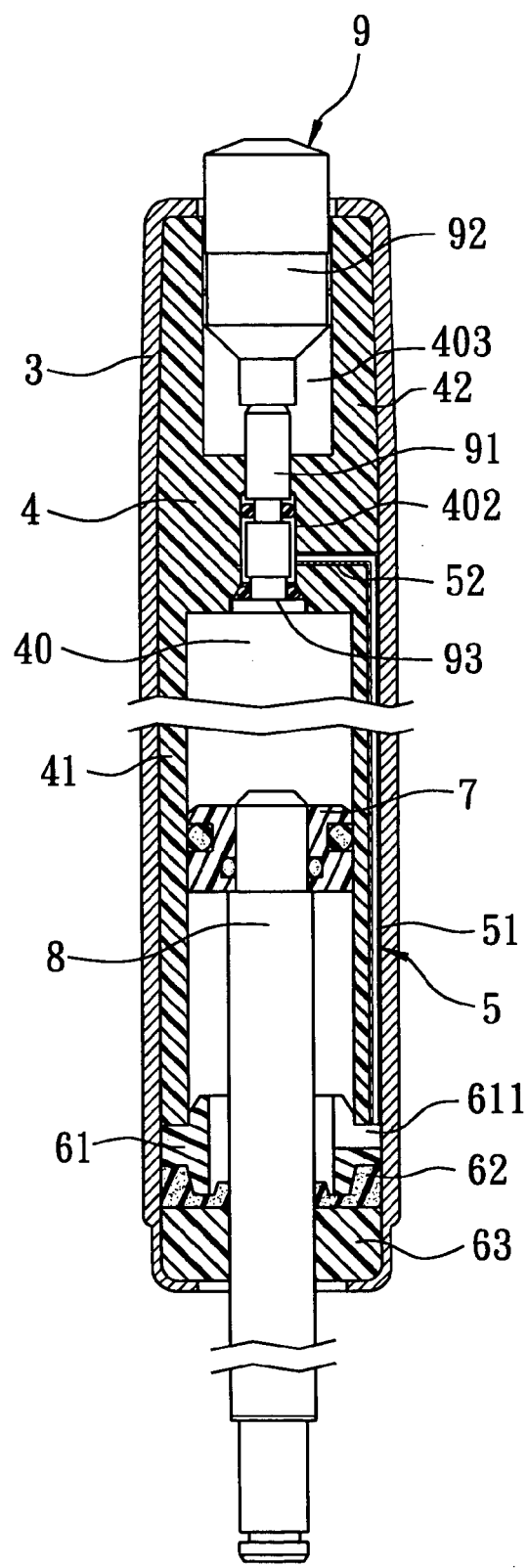
FIG. 2 is a longitudinal sectional view of a telescopic pneumatic device according to a first preferred embodiment of the present invention.

As shown in FIG. 2, the telescopic pneumatic device according to a first preferred embodiment of the present invention generally comprises a vertical tubular outer cylinder 3, a tubular inner cylinder 4 coaxially disposed in the outer cylinder 3 and having a cylinder wall 41 defining an air chamber 40, a flow passage 5 provided between the cylinder wall 41 and the outer cylinder 3, a piston 7 capable of reciprocal motion mounted in the air chamber 40 of the inner cylinder 4 and a piston rod 8 connected thereto, and a control valve 9 provided at the upper end portion of the air chamber 40 of the inner cylinder 4 and upwardly protruding out of the outer cylinder 3. A sleeve 61, and a leak-preventing washer 62 provided around the piston rod 8 for preventing gas leak from the air chamber 40, are disposed at the lower end of the outer cylinder 3, capped by an end cap 63. The piston rod 8 extends downwardly from the piston 7, passing through the sleeve 61, washer 62 and the end cap 63 and out of the outer cylinder 3.

The inner cylinder 4 is made of rigid plastic material and further includes a valve mounting part 42 formed in one piece with the cylinder wall 41 by plastic injection molding. High-pressure gas is introduced into the air chamber 40 defined by the cylinder wall 41, and the control valve 9 is mounted in the valve mounting part 42. The valve mounting part 42 has a first cavity 402 in fluid communication with the air chamber 40 and the flow passage 5, and a second cavity 403 of larger cross section than the first cavity 402.

In this embodiment, the flow passage 5 is in the form of a hollow conduit 50 embedded in the inner cylinder 4. The conduit 50 is made of a rigid material such as steel or iron or engineered plastics. The flow passage 5 is divided into a first passage section 51 extending longitudinally along the cylinder wall 41 and a second passage section 52 connected to the first passage section 51 and the first cavity 402. The end of the first passage section 51 is in communication with the air chamber 40 via a guide hole 611 provided in the sleeve 61, while the end of the second passage section 52 is in communication with the first cavity 402 of the valve mounting part 42.

Figure 3:
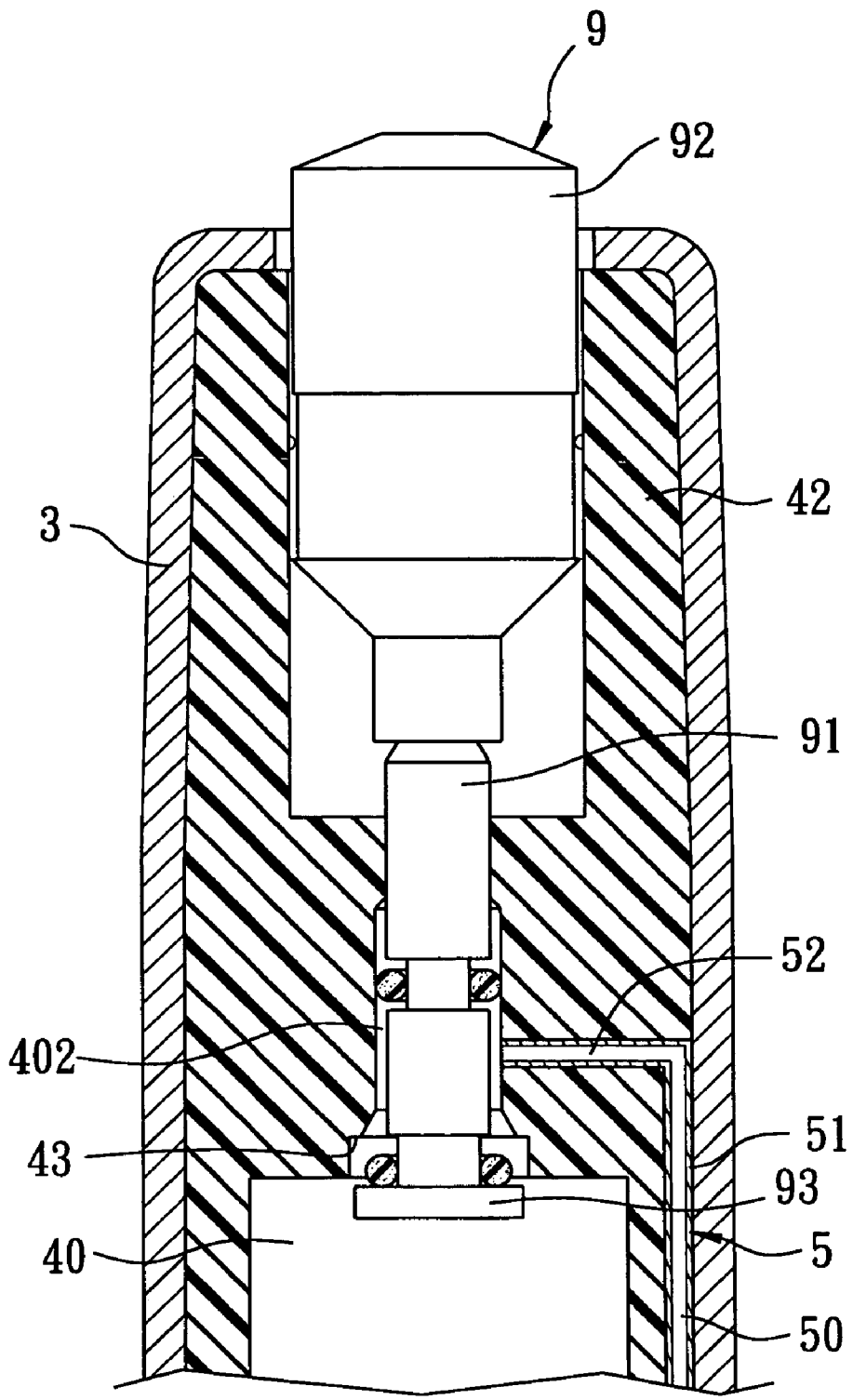
FIG. 3 is an enlarged, partial view of the first preferred embodiment, showing the condition of the telescopic pneumatic device when the air chamber of the inner cylinder and the flow passage are in communication.

The control valve 9 includes a valve section 91 disposed in the first cavity 402 and an operating section 92 connected to the valve section 91 and protruding upwardly out of the outer cylinder 3. In this embodiment, the operating section 92 is in the form of a push button and is received in the second cavity 403 of the valve mounting part 42. The valve mounting part 42 further has a valve seat 43 (see FIG. 3), and the valve section 91 has a valve member 93 to seat on the valve seat 43. The control valve 9 is operable to control the valve section 92 so as to permit or interrupt communication between the flow passage 5 and the air chamber 40. Specifically, in the normal condition when the operating section 92 is not pressed, the valve member 93 abuts against the valve seat 43 so that the communication between the first cavity 402 and the air chamber 40 is interrupted. When the push button 92 is pressed, the valve member 93 is displaced downwardly, as shown in FIG. 3. At this point, the first cavity 402 will be in communication with the air chamber 40 and the second passage section 52 of the flow passage 5, and the gas filled in the air chamber 40 can flow between the air chamber 40 and the flow passage 5. If opposing forces are respectively applied to the outer cylinder 3 at the top and to the piston rod 8 at the bottom, the displacement of the piston 7 in the air chamber 40 can be controlled to adjust the length of the piston rod 8 projecting out of the outer cylinder 3.

To manufacture the inner cylinder 4 and flow passage 5, the conduit 50 is first provided at a predetermined position inside the hollow outer cylinder 3, and then the cylinder wall 41 of the inner cylinder 4 is directly formed in the outer cylinder 3 by plastic injection molding technology, thereby the cylinder wall 41 is directly attached the internal wall of the outer cylinder 3 and at the same time embed the conduit 50, which forms the flow passage 5, therein. Alternatively, however, the inner cylinder 4 may be formed separately from the outer cylinder 3 and may be molded over the conduit 50 to form the flow passage 5, thereby embedding the conduit 50 in the inner cylinder 4. Then the inner cylinder 4 is inserted and secured in the outer cylinder 3.

Still another alternative is to produce the flow passage 5 without employing a conduit. In this respect, the cylinder wall 41 of the inner cylinder 4 is directly formed inside the outer cylinder 3 by plastic injection molding technology, the flow passage 5 being directly formed in the cylinder wall 41 during the process of molding the cylinder wall 41.

Figure 4:
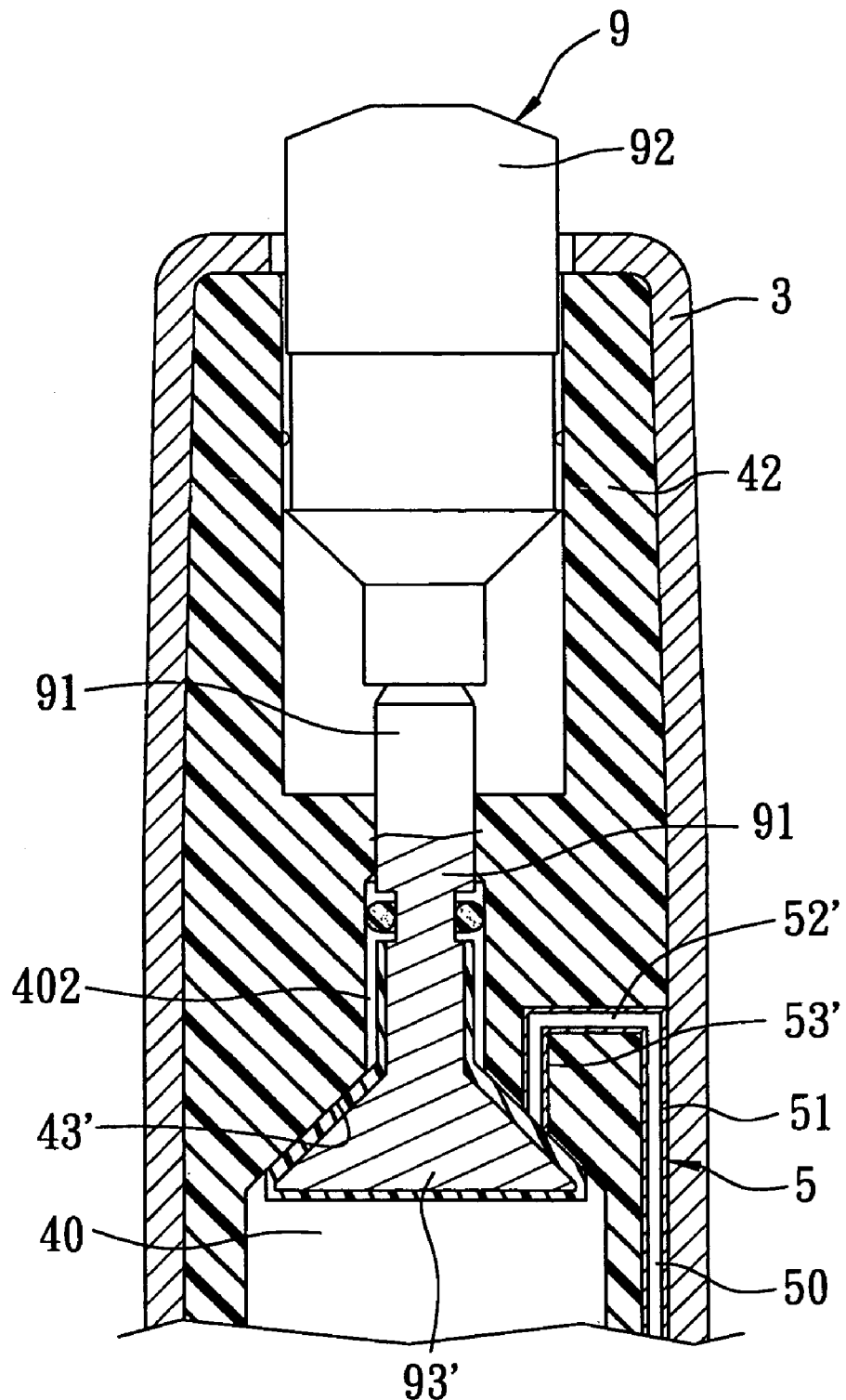
FIG. 4 is an enlarged, partial view of the telescopic pneumatic device according to a second preferred embodiment of the present invention.

FIG. 4 shows a second preferred embodiment of the telescopic pneumatic device according to the present invention. The difference of this second embodiment over the first embodiment can be noted in the outer appearance of the valve mounting part 42', the flow passage 5 and the valve section 91.

In this embodiment, the valve mounting part 42 has a frusto-conical valve seat 43' and the valve section 91 has a corresponding frusto-conical valve member 93' to seat on the valve seat 43'. The second flow passage section 52' of the flow passage 5 is further formed with an extended section 53' which is in fluid communication with the first cavity 402. The valve member 93' blocks the open end of the extended section 53' to interrupt the communication between the flow passage 5 and the air chamber 40.

Because the manner of operation of this embodiment is the same as that of the first embodiment, further description in this regard is omitted.

As can be appreciated from the foregoing description of the telescopic pneumatic device according to the present invention, the inner cylinder 4 provided with the flow passage 5 is formed in the outer cylinder 3 by integral plastic injection molding, so that the inner cylinder 4 and the flow passage 5 are directly and stably secured in the outer cylinder 3. The inner cylinder 4 being made of plastic material provides for cost savings in terms of material. Further, due to the valve mounting part 42 being formed in one piece with the cylinder wall 41 during injection molding, the control valve 9 is directly assembled in the inner cylinder 4 so that the various components that were necessary in the prior art for mounting the control valve 9 in the telescopic pneumatic device can be spared, and the assembly process is thus simplified. Therefore, the design of the present invention in which there are fewer overall components and plastic is employed as the material for some of the components provides for more convenient machining process and less complicated assembly, as well as reduced manufacturing costs not only in terms of the processing and assembly but also of material.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A telescopic pneumatic device comprising:
   an outer cylinder;
   an inner cylinder disposed in said outer cylinder and being made of a rigid plastic material, said inner cylinder including a cylinder wall defining therein an air chamber, and a valve mounting part which is formed in one piece with said cylinder wall, said valve mounting part having a first cavity;
   a piston capable of reciprocal motion mounted in said air chamber;
   a piston rod connected to said piston and extending out of said outer cylinder;
   a flow passage provided between said cylinder wall and said outer cylinder and having two ends connected respectively to said first cavity and said air chamber;
   a conduit embedded in said cylinder wall of said inner cylinder and defining said flow passage; and
   a control valve mounted within said valve mounting part and including a valve section disposed within said first cavity and an operating section connected to said valve section and being operable to control said valve section so as to permit or interrupt fluid communication between said flow passage and said air chamber.

2. The telescopic pneumatic device as claimed in claim 1, wherein said cylinder wall of said inner cylindrical is formed by injection molding.

3. The telescopic pneumatic device as claimed in claim 1, wherein said valve mounting part further has a frusto-conical valve seat, and said valve section has a frusto-conical valve member to be seated on said valve seat.

4. The telescopic pneumatic device as claimed in claim 1, wherein said cylinder wall of said inner cylinder is molded over said conduit.

5. The telescopic pneumatic device chair as claimed in claim 1, wherein said flow passage has a first passage section extending longitudinally along said cylinder wall and a second passage section connected to said first passage section and said first cavity.

* * * * *